(12) United States Patent
Kim et al.

(10) Patent No.: US 6,180,749 B1
(45) Date of Patent: Jan. 30, 2001

(54) GLASS CLEAR HEAVY GAUGE SHEET WITH COPOLYESTER

(75) Inventors: Kyeong Ah Kim; Young Seok Kim, both of Kyunggi-do; Yong Cheol Shin, Seoul; Boung Kun Son, Kyunggi-do; Young Bum Kim, Kyunggi-do; Suck Jung Song, Kyunggi-do, all of (KR)

(73) Assignee: Kolon Industries, Inc. (KR)

( * ) Notice: Under 35 U.S.C. 154(b), the term of this patent shall be extended for 0 days.

(21) Appl. No.: 09/184,021

(22) Filed: Nov. 2, 1998

(30) Foreign Application Priority Data

| Nov. 19, 1997 | (KR) | 97-61102 |
| Nov. 19, 1997 | (KR) | 97-61103 |
| Nov. 19, 1997 | (KR) | 97-61104 |
| Nov. 19, 1997 | (KR) | 97-61105 |
| Nov. 19, 1997 | (KR) | 97-61106 |
| Nov. 19, 1997 | (KR) | 97-61107 |
| Jun. 18, 1998 | (KR) | 98-22838 |

(51) Int. Cl.$^7$ .................................................. C08G 63/02
(52) U.S. Cl. ................ 528/272; 264/176.1; 264/211.24; 264/219; 528/271
(58) Field of Search ........................... 264/176.1, 211.24, 264/219; 528/176, 271, 272

(56) References Cited

U.S. PATENT DOCUMENTS

| 5,328,655 | * | 7/1994 | Fortin | 264/544 |
| 5,472,660 | * | 12/1995 | Fortin | 264/522 |
| 5,683,648 | * | 11/1997 | Fortin | 264/550 |

* cited by examiner

Primary Examiner—Terressa M. Boykin
(74) Attorney, Agent, or Firm—Birch, Stewart, Kolasch & Birch, LLP

(57) ABSTRACT

The present invention relates to a glass clear heavy gauge sheet with copolyester, having over than 83% of lights transmittance and lower than 5% of Haze, prepared by copolymer wherein polymerized [A] the acid ingredient component (i) terephthalate moiety as major component and (ii) essentially including 2,6-naphthalenedicarboxylate moiety, and (iii) selectively including isophthalate moiety with [B] the glycol component of (i) ethyleneglycol (EG) itself or (ii) the mixture of ethyleneglycol (EG) and 1,4-cyclohexandimethanol (CHDM).

A glass clear heavy gauge sheet with copolyester of the present invention is suitable various industrial usages such as glass substitute of automobile, window glass substitute of high building, and transparent soundproof wall.

10 Claims, No Drawings

GLASS CLEAR HEAVY GAUGE SHEET WITH COPOLYESTER

BACKGROUND OF THE INVENTION

1. Field of the Invention

The present invention relates to a glass clear heavy gauge sheet with copolyester which has excellent transparency and all properties with cheap production cost.

Polyethyleneterephthalate (hereinafter called "PET") resin having been utilized in PET bottle, garment fiber, film and other vast fields due to its excellence of properties, processing, and economical aspects. It has been radically increased to use the PET resin as packing material based on its excellent mechanical properties, chemical resistance and recyclability. Sheet is one prevalently used among other fields, especially thin sheet(thinner than 1 mm) for vacuum forming. The polyester sheet thicker than 1 mm, however, is not easy for producing due to its crystallization and melt viscosity.

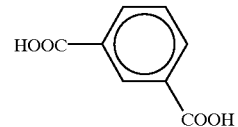

[Formula (I) means TPA and formula (II) means IPA]

Since the reactivity of EPA in reaction circle during PET polymerization is fairly good, it reacts very well to some extent mol %. Since the copolyester, polymerized by some mol % of IPA or DMI, has the structure of formula (IV), it is different from homo PET which has the structure of formula (III).

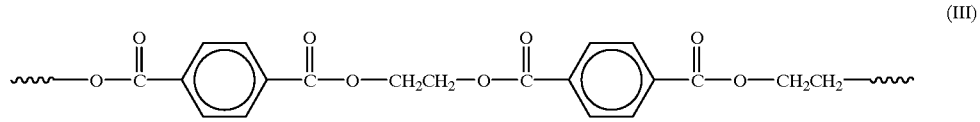

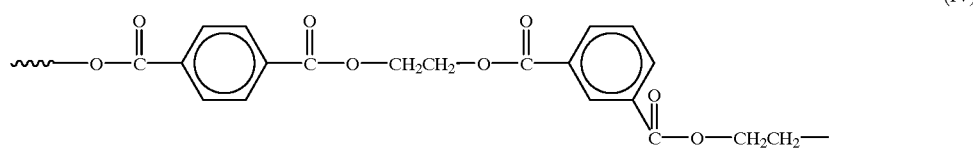

2. Description of Prior Art

In order to produce thick sheet(hereinafter called "thick sheet") with polymeric material, the polymeric material needs to have properties of low crystallization speed and low crystallization degree with proper high melting viscosity in order to maintain forming stability in melting condition. A new trial for the purpose of satisfying these properties, was to produce a modified polyester by copolymerization.

There are two methods in producing the modified polyester as follow:

First of all, substitute the some part of terephthalate moiety used as acid component during PET polymerization, such as Dimethylterephthalate (hereinafter called "DMT") or Terephthalic Acid (hereinafter called "TPA") with Diacid or Diacidester. As for Diacid or Diacidester, Isophthalic Acid (hereinafter called "IPA") or Dimethylisophthalate (hereinafter called "DMI") are applied mainly. This method, in other words, is producing polyester copolymer by polymerizing [i] DMT or TPA, [ii] DMI or EPA and [iii] Ethyleneglycol (hereinafter called "EG").

As expressed in following formula (I) and (II), TPA and IPA are same in their structure only except the position of functioning radical attached to Benzene chain.

According to the structural differences, the copolyester of formula (IV) has the effects of decreasing crystallization speed and crystallization degree since the interference to regularity of molecular chain during crystallization.

However, in proportion to the increase of EPA or DMI content, some properties of resin shall be suddenly deteriorated. In case, minimizing the IPA or DMI content for the purpose of preventing the deterioration of properties, it would not be possible to have the effects of sufficiently low crystallization rate. Because of this problem, the copolyester of formula (IV) constituted of around 3 mol % of EPA or DMI, is used only for producing thick bottle or thin sheet.

The second method is to substitute the some part of Ethyleneglycol used as one of the essential monomer applied during PET production with 1,4-Cyclohexandimethanol (hereinafter called "CHDM"). In other words, after preparing polyester copolymer by polymerizing [i] DMT or TPA, [ii] EG and [iii] CHDM, produce transparent and thick copolyester sheet by utilizing this polyester copolymer.

Since the length of CHDM molecule, having the structure of formula (V), is longer than that of EG, it disturbs the regularity of the molecule chain, and then decrease the crystallization rate and the crystallinity.

Furthermore, as the molecular chain of CHDM, like EPA, is not clamped, the reactivity and properties of polymer would not be deteriorated, and has high melt viscosity required for producing thick sheet even though the CHDM content increases

(V)

In order to obtain the properties, which enable to form the transparent and thick sheet, such as low crystallization rate, low crystallinity and high melt viscosity, it is necessary to use CHDM up to of 30 mol %. As a result, the producing cost comes to be very expensive and this is the limit in practical use.

Although, it is indispensable to have high molecular weight in order to obtain enough mechanical properties, if CHDM is polymerized in large quantity, there is no way except to raise molecular weight in the melt polymerization due to its amorphous phase by CHDM. Therefore, in order to obtain the high molecular weight, fairly good effort is needed to use with specially designed polymerization plant. Eastman Chemical Co. produces polyester copolymer by the second method, and sells them as common name "PETG" and also as trademark "SPECTAR".

SUMMARY OF THE INVENTION

The present invention relates to a glass clear heavy gauge sheet with copolyester, having excellent transparency and all properties with cheap production cost, suitable for transparent soundproof wall and window glass substitute of the buildings.

More particularly, the present invention relates to a glass clear heavy gauge sheet with copolyester, having over than 83% of lights transmittance and lower than 5% of Haze, prepared by copolymer wherein polymerized [A] the acid component comprising (i) terephthalate moiety as major component and (ii) essentially including 2,6-naphthalenedicarboxylate moiety, and (iii) selectively including isophthalate moiety with [B] the glycol component of (i) ethyleneglycol (EG) itself or (ii) the mixture of ethyleneglycol (EG) and 1,4-cyclohexandimethanol (CHDM).

DESCRIPTION OF THE PREFERRED EMBODIMENT

The present invention is characterized by essentially applying 2,6-naphthalenedicarboxylate moiety as a part of acid component during polymerization, and at the same time selectively using isophthalate moiety in order to control specific thermodynamic requirements for forming transparent and thick sheet.

The present invention also characterized by selectively applying 1,4-cyclohexandimethanol (CHDM) as a part of glycol component.

In the present invention, dimethylterephthalate (DMT) or terephthalic acid (TPA) is mainly used as terephthalate moiety. Also, dimethyl-2, 6-Naphthalenedicarboxylate (hereinafter called "NDC") or 2,6-naphthalene dicarboxylic acid (hereinafter called "NDA") is mainly used as dimethyl-2, 6-naphthalenedicarboxylate moiety. As for isophthalate moiety, isophthal acid (IPA) or dimethylisophthalate (DMI) is used mainly.

For the purpose of producing transparent and thick sheet with polymer such as copolyester, following fundamental properties are required:

Firstly, thermal stability that molecular chain is not easily decomposed in melting condition is required since the material is processed in melting condition.

Secondly, high melt viscosity for maintaining the form as thick sheet in melting condition is required. However, if the melt viscosity is too high, it will be difficult to process. Therefore, the melting viscosity shall be high enough within the possible extent of processing.

Thirdly, sufficiently low crystallization is required. The thicker thickness sheet gets, the harder sheet cools. Therefore, in order to prevent the crystallizing which deteriorates the transparency of sheet, low crystallization rate is favorable and it is better if the material itself has low crystallinity.

In case, certain material partly meets the requirements among above, it is difficult to produce thick sheet. So, material needs to meet all possible properties.

The present invention will be illustrated more particularly hereunder.

After preparing the copolyester resin by melt polymerization [A] the acid component comprising (i) terephthalate moiety TPA or DMT is used as major component, (ii) essentially contains 2,6-naphthalenedicarboxylate moiety NDC or NDA, and (iii) selectively contains isophthalate moiety IPA or DMI with [B] the glycol component of (i) EG itself or (ii) the mixture of EG and CHDM, then produce thick sheet by extrusion of prepared copolyester.

In the present invention, dimethyl-2, 6-naphthalenedicarboxylate (NDC) used as acid component, has the structure of formula (VI), and 2,6-naphthalene dicarboxyl acid (NDA) has the structure of formula (VII).

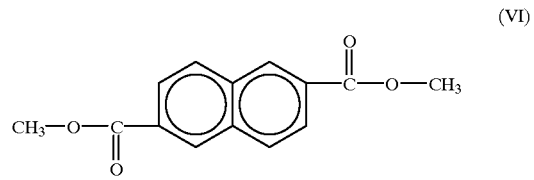
(VI)

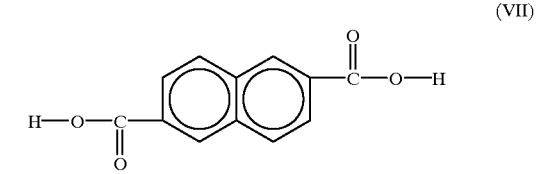
(VII)

NDC or NDA, as shown above, is mostly used to prepare polyethylenenaphthalate (hereinafter called "PEN") by polycondensation with EG.

(VIII)

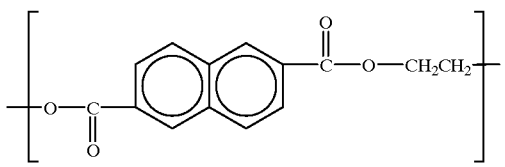

PEN shows very excellent characteristics than PET in almost all properties such as heat resistance, UV protection, gas barrier, mechanical strength and hydrolysis resistance. However, the price of NDC or NDA, the main material, is expensive, and the difficulty in producing, the practical application of PEN is limited to the area such as high performance film of video tape and special purpose container. Recently, a method of copolymerization or blending with PET were introduced to secure the competitiveness against price, but the scope of invention is restricted to some fields yet.

Meanwhile, the purpose of present invention is not to improve the existing characteristics such as heat resistance or UV protection, but to use NDC or NDA as comonomer for the purpose of controlling the thermodynamic peculiarity which is necessary for forming the transparent and thick sheet. That is to say, NDC or NDA is used as comonomer in order to decrease crystallization rate and low crystallinity properly for producing transparent and thick sheet, and securing melting viscosity in maintaining intensity for ease forming in melting condition.

More particularly, the present invention is to prepare random copolyester resin, having 0.70~0.90 of inherent viscosity, by melt polymerization [A] the glycol component of (i) EG or (ii) mixture of EG and CHDM with [B] the acid component comprising (i) NDC or NDA and (ii) DMT or TPA, or comprising (i) NDC or NDA, (ii) DMT or TPA and (iii) IPA or DMI.

In case, polymerizing [A] the acid ingredient composed of (i) TPA or DMT and (ii) NDC or NDA, with [B] the glycol ingredient of (i) EG or (ii) mixture of EG and CHDM, random copolyester resin of formula (IX) shall be prepared as follow:

During melt copolymerization, the favorable content of 2,6-naphthalene dicarboxylate moiety against total acid component shall be less than 20 mol %, but the content shall not be specially restricted. However, in general, the crystallization of resin itself shall be proportionally lowered by much content of 2,6-naphthalene dicarboxylate moiety. It is possible to adjust the inherent viscosity of resin by solid state polymerization after melt polymerization if the crystallization rate of resin itself comes lowered due to too much 2,6-naphthalene dicarboxylate moiety.

During copolymerization, the favorable content of isophthalate moiety against total acid component shall be 0.5~5 mol %. In the mean time, if EG and CHDM is applied at the same time as glycol component, the favorable content of CHDM moiety against total acid component shall be less than 15 mol %.

In the random copolyester resin structure of formula (IX), if NDC or NDA is used instead of TPA or DMT, and CHDM is used instead of EG, then the length of unit structure will be longer but the angle of molecular chain remains unchanged. In this case, its structure is more like aforementioned PETG, the brand name of Eastman Chemical Co. rather than the structure of formula (IV). Consequently, the mechanism which affects to crystallization property shall be similar to PETG, the brand name of Eastman Chemical Co., and it is easier to form the thick copolyester sheet.

Said partial inequality of molecular chain functions as obstruction factor in crystal forming, which requires equality, it delays the crystallization and decrease the crystallinity at the same time. Together with said effects, the reactivity shall not be deteriorated during polymerization reaction, it shall be easy to polymerize, and the properties shall be more improved because the PEN property has been added to PET or PETG property. As a result, the copolyester resin of the present invention prepared by aforesaid method is enables to form the transparent and thick copolyester sheet easily because the copolyester resin meets the all thermodynamic characteristics required in the process of glass clear heavy gauge sheet with copolyester.

In the following, put the said copolyester resin into extruder, and then produce the glass clear heavy gauge sheet with copolyester of the present invention by extrusion of the said resin.

The lights transmittance of the glass clear heavy gauge sheet with copolyester of the present invention is over than 83%, and its Haze is below than 5%.

In addition, the heat of cooling crystallization (ΔHmc) of the glass clear heavy gauge sheet with copolyester of the present invention is below than 1.0 J/g, and its refractive index of visible lights is 1.35~1.70

Since the heat of cooling crystallization (ΔHmc) of the glass clear heavy gauge sheet with copolyester of the present (IX)

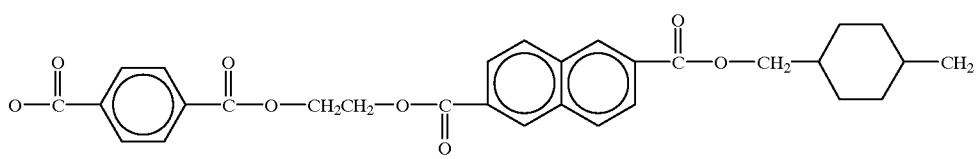

invention is high, crystallization during polymer cooling shall be proceeded actively.

Also, the melt viscosity, measured in Shear rate of 1,000 sec-1 at the temperature of 270° C., of the glass clear heavy gauge sheet with copolyester of the present invention is 900~8,000 Poise, and the melt viscosity, measured in Shear rate of 100 sec-1 at the temperature of 270° C. is 1,700~30, 000 Poise, and thickness is thicker than 1 mm, more favorably thicker than 3 mm.

Each properties of the glass clear heavy gauge sheet with copolyester of the present invention, as illustrated above, is measured by following method:

Haze (%) and Lights Transmittance (%)

After cutting the certain part of the glass clear heavy gauge sheet with copolyester measure with Haze Meter (product of Nippon Denshoku, NDH-300A-Japan)

Heat of Cooling Crystallization (J/g)

After fixing the glass clear heavy gauge sheet with copolyester more than 3 minute at 290° C., measure the Heat of Cooling Crystallization by DSC at the cooling speed of 20° C. per minute.

Refractive Index of visible lights

Measure by Abbe refratometer.

The present invention shall be discussed more particularly through following executed examples. The present invention, however, is not restricted only to the following examples:

EXAMPLE 1

Put 3 mol % of NDC and 3 mol % of CHDM respectively against total acid component into the mixture of TPA and EG, and prepare copolyester resin by melt polymerization. Let the inherent viscosity (IV) of the prepared copolyester resin shall be 0.80 by solid state polymerization. After putting the said copolyester resin into extruder, then produce the glass clear sheet, having 6 mm thickness by extrusion the said resin. Evaluation results of each properties of the produced glass clear sheet are shown in Table 1.

EXAMPLE 2

Put 8 mol % of NDC and 3 mol % of IPA and 8 mol % CHDM respectively against total acid component into the mixture of TPA and EG, and prepare copolyester resin by melt polymerization. Let the inherent viscosity (IV) of the prepared copolyester resin shall be 0.75 by solid state polymerization. After putting the said copolyester resin into extruder, then produce the glass clear sheet, having 8 mm thickness by extrusion the said resin. Evaluation results of each properties of the produced glass clear sheet are shown in Table 1.

EXAMPLE 3

Put 8 mol % of NDC and 15 mol % of CHDM respectively against total acid component into the mixture of TPA and EG, and prepare copolyester resin by melt polymerization. Let the inherent viscosity (IV) of the prepared copolyester resin shall be 0.71 by solid state polymerization. After putting the said copolyester resin into extruder, then produce the glass clear sheet, having 10 mm thickness by extrusion the said resin. Evaluation results of each properties of the produced glass clear sheet are shown in Table 1.

EXAMPLE 4

Put 5 mol % of NDA respectively against total acid component into the mixture of TPA and EG, and prepare copolyester resin by melt polymerization. Let the inherent viscosity (IV) of the prepared copolyester resin shall be 0.88 by solid state polymerization. After putting the said copolyester resin into extruder, then produce the glass clear sheet, having 4 mm thickness by extrusion the said resin. Evaluation results of each properties of the produced glass clear sheet are shown in Table 1.

EXAMPLE 5

Put 3 mol % of NDA respectively against total acid component into the mixture of TPA and EG, and prepare copolyester resin by melt polymerization. Let the inherent viscosity (IV) of the prepared copolyester resin shall be 0.85 by solid state polymerization. After putting the said copolyester resin into exdruder, then produce the glass clear sheet, having 8 mm thickness by extrusion the said resin. Evaluation results of each properties of the produced glass clear sheet are shown in Table 1.

EXAMPLE 6

Put 8 mol % of NDA and 1 mol % of EPA respectively against total acid component into the mixture of TPA and EG, and prepare copolyester resin by melt polymerization. Let the inherent viscosity (IV) of the prepared copolyester resin shall be 0.71 by solid state polymerization. After putting the said copolyester resin into extruder, then produce the glass clear sheet, having 6 mm thickness by extrusion the said resin. Evaluation results of each properties of the produced glass clear sheet are shown in Table 1.

EXAMPLE 7

Put 5 mol % of NDA against total acid component into the mixture of TPA and EG, and prepare copolyester resin (A), having its inherent viscosity is 0.85, by melt polymerization. In the mean time, Put 8 mol % of NDA against total acid component into the mixture of TPA and EG, and prepare copolyester resin (B), having its inherent viscosity is 0.82, by melt polymerization. After blending the prepared copolyester resins (A) and (B) at the ratio of 1:1, and putting the blended copolyester resins into extruder, then produce the glass clear sheet, having 6 mm thickness by extrusion the said resins. Evaluation results of each properties of the produced glass clear sheet are shown in Table 1.

EXAMPLE 8

Put 5 mol % of NDC respectively against total acid component into the mixture of DMT and EG, and prepare copolyester resin by melt polymerization. Let the inherent viscosity (IV) of the prepared copolyester resin shall be 0.88 by solid state polymerization. After putting the said copolyester resin into extruder, then produce the glass clear sheet, having 4 mm thickness by extrusion the said resin. Evaluation results of each properties of the produced glass clear sheet are shown in Table 1.

EXAMPLE 9

Put 8 mol % of NDC and 1 mol % of DMI respectively against total acid component into the mixture of DMT and EG, and prepare copolyester resin by melt polymerization. Let the inherent viscosity (IV) of the prepared copolyester resin shall be 0.85 by solid state polymerization. After putting the said copolyester resin into extruder, then produce the glass clear sheet, having 8 mm thickness by extrusion the said resin. Evaluation results of each properties of the produced glass clear sheet are shown in Table 1.

EXAMPLE 10

Put 4 mol % of NDC respectively against total acid component into the mixture of DMT and EG, and prepare copolyester resin, having its inherent viscosity is 0.71, by melt polymerization. After putting the said copolyester resin into extruder, then produce the glass clear sheet, having 6 mm thickness by extrusion the said resin. Evaluation results of each properties of the produced glass clear sheet are shown in Table 1.

EXAMPLE 11

Put 5 mol % of NDC and 3 mol % of DMI against total acid component into the mixture of DMT and EG, and prepare copolyester resin (A), having its inherent viscosity is 0.85, by melt polymerization. In the mean time, Put 8 mol % of NDC and 4 mol % of DMI against total acid component into the mixture of DMT and EG, and prepare copolyester resin (B), having its inherent viscosity is 0.82, by melt polymerization. After blending the prepared copolyester resins (A) and (B) at the ratio of 1:1, and putting the blended copolyester resins into extruder, then produce the glass clear sheet, having 6 mm thickness by extrusion the said resins. Evaluation results of each properties of the produced glass clear sheet are shown in Table 1.

EXAMPLE 12

Put 3 mol % of NDC and 3 mol % of CHDM respectively against total acid component into the mixture of DMT and EG, and prepare copolyester resin by melt polymerization. Let the inherent viscosity (IV) of the prepared copolyester resin shall be 0.80 by solid state polymerization. After putting the said copolyester resin into extruder, then produce the glass clear sheet, having 6 mm thickness by extrusion the said resin. Evaluation results of each properties of the produced glass clear sheet are shown in Table 1.

EXAMPLE 13

Put 8 mol % of NDC and 1 mol % of DMI and 8 mol % of CHDM respectively against total acid component into the mixture of DMT and EG, and prepare copolyester resin by melt polymerization. Let the inherent viscosity (IV) of the prepared copolyester resin shall be 0.75 by solid state polymerization. After putting the said copolyester resin into extruder, then produce the glass clear sheet, having 8 mm thickness by extrusion the said resin. Evaluation results of each properties of the produced glass clear sheet are shown in Table 1.

EXAMPLE 14

Put 8 mol % of NDC and 15 mol % of CHDM respectively against total acid component into the mixture of DMT and EG, and prepare copolyester resin by melt polymerization. Let the inherent viscosity (IV) of the prepared copolyester resin shall be 0.71 by solid state polymerization. After putting the said copolyester resin into extruder, then produce the glass clear sheet, having 10 mm thickness by extrusion the said resin. Evaluation results of each properties of the produced glass clear sheet are shown in Table 1.

EXAMPLE 15

Put 5 mol % of NDC respectively against total acid component into the mixture of TPA and EG, and prepare copolyester resin by melt polymerization. Let the inherent viscosity (IV) of the prepared copolyester resin shall be 0.88 by solid state polymerization. After putting the said copolyester resin into extruder, then produce the glass clear sheet, having 4 mm thickness by extrusion the said resin. Evaluation results of each properties of the produced glass clear sheet are shown in Table 1.

EXAMPLE 16

Put 8 mol % of NDC and 1 mol % of EPA respectively against total acid component into the mixture of TPA and EG, and prepare copolyester resin by melt polymerization. Let the inherent viscosity (IV) of the prepared copolyester resin shall be 0.85 by solid state polymerization. After putting the said copolyester resin into extruder, then produce the glass clear sheet, having 8 mm thickness by extrusion the said resin. Evaluation results of each properties of the produced glass clear sheet are shown in Table 1.

EXAMPLE 17

Put 5 mol % of NDC and 1 mol % of IPA respectively against total acid component into the mixture of TPA and EG, and prepare copolyester resin, having its inherent viscosity is 0.71, by melt polymerization. After putting the said copolyester resin into extruder, then produce the glass clear sheet, having 6 mm thickness by extrusion the said resin. Evaluation results of each properties of the produced glass clear sheet are shown in Table 1.

EXAMPLE 18

Put 5 mol % of NDC against total acid component into the mixture of TPA and EG, and prepare copolyester resin (A), having its inherent viscosity is 0.85, by melt polymerization. In the mean time, Put 8 mol % of NDC against total acid component into the mixture of TPA and EG, and prepare copolyester resin (B), having its inherent viscosity is 0.82, by melt polymerization. After blending the prepared copolyester resins (A) and (B) at the ratio of 1:1, and putting the blended copolyester resins into extruder, then produce the glass clear sheet, having 6 mm thickness by extrusion the said resins. Evaluation results of each properties of the produced glass clear sheet are shown in Table 1.

EXAMPLE 19

Put 5 mol % of NDA and 2 mol % of DMI respectively against total acid component into the mixture of DMT and EG, and prepare copolyester resin by melt polymerization. Let the inherent viscosity (IV) of the prepared copolyester resin shall be 0.88 by solid state polymerization. After putting the said copolyester resin into extruder, then produce the glass clear sheet, having 4 mm thickness by extrusion the said resin. Evaluation results of each properties of the produced glass clear sheet are shown in Table 1.

EXAMPLE 20

Put 8 mol % of NDA respectively against total acid component into the mixture of DMT and EG, and prepare copolyester resin by melt polymerization. Let the inherent viscosity (IV) of the prepared copolyester resin shall be 0.85 by solid state polymerization. After putting the said copolyester resin into extruder, then produce the glass clear sheet, having 8 mm thickness by extrusion the said resin. Evaluation results of each properties of the produced glass clear sheet are shown in Table 1.

EXAMPLE 21

Put 4 mol % of NDA respectively against total acid component into the mixture of DMT and EG, and prepare copolyester resin, having its inherent viscosity is 0.71, by melt polymerization. After putting the said copolyester resin into extruder, then produce the glass clear sheet, having 6 mm thickness by extrusion the said resin. Evaluation results of each properties of the produced glass clear sheet are shown in Table 1.

EXAMPLE 22

Put 5 mol % of NDA and 4 mol % of DMI against total acid component into the mixture of DMT and EG, and prepare copolyester resin (A), having its inherent viscosity is 0.85, by melt polymerization. In the mean time, Put 8 mol % of NDA and 1 mol % of DMI against total acid component into the mixture of DMT and EG, and prepare copolyester resin (B), having its inherent viscosity is 0.82, by melt polymerization. After blending the prepared copolyester resins (A) and (B) at the ratio of 1:1, and putting the blended copolyester resins into extruder, then produce the glass clear sheet, having 6 mm thickness by extrusion the said resins. Evaluation results of each properties of the produced glass clear sheet are shown in Table 1.

Melting viscosity in <Table 1>, X means that Shear Rate is 1,000 sec-1, and Y means that Shear Rate is 100 sec-1.

In spite of thick thickness of the glass clear heavy gauge sheet with copolyester of the present invention, it has excellent transparency due to its high lights transmittance. Moreover, it has excellent properties such as mechanical property and so on, its production cost is cheap besides. As a result, the glass clear heavy gauge sheet with copolyester of the present invention could be practically useful in various industrial usages such as transparent soundproof wall, window glass substitutes of high building or automobile.

At the same time, the present invention can keep following effects:

First, ease of producing glass clear heavy gauge sheet with copolyester sheet since its possibility on controlling the melting viscosity. Based on the extensive changes in melting viscosity according to the content quantity of 2,6-naphthalenedicarboxylate moiety (NDC or NDA) and CHDM, and on the wide range in controlling content quantity of 2,6-naphthalenedicarboxylate moiety (NDC or NDA) and CHDM, the present invention can support to produce the various characteristics of copolyesters. Especially, based on wide controlling range of resin properties in melting condition, it easily overcomes the restriction of possible forming thickness. Consequently, it is comfortably possible to produce 10 mm-thick transparent and thick copolyester sheet, which has been difficult with existing polyester resin.

Second, no property deterioration in proportion to the increase of content quantity of 2,6-naphthalenedicarboxylate moiety (NDC or NDA)

Third, ease of decreasing the crystallization property.

TABLE 1

Evaluation results of each properties of the produced copolyester sheet

| | Thickness (mm) | Lights transmittance (%) | Haze (%) | Heat of cooling crystallization (J/g) | Refractive Index of visible lights | Melt viscosity (poise) | |
|---|---|---|---|---|---|---|---|
| | | | | | | X | Y |
| Example 1 | 6 | 87 | 3.1 | 0.90 | 1.40 | 900 | 2,000 |
| Example 2 | 8 | 85 | 4.1 | 0.80 | 1.53 | 4,000 | 10,000 |
| Example 3 | 10 | 82 | 5.0 | 0.85 | 1.67 | 8,000 | 25,000 |
| Example 4 | 4 | 86 | 2.9 | 0.98 | 1.49 | 1,000 | 3,000 |
| Example 5 | 8 | 85 | 3.5 | 0.82 | 1.55 | 3,000 | 10,000 |
| Example 6 | 6 | 85 | 4.0 | 0.79 | 1.59 | 8,000 | 25,000 |
| Example 7 | 6 | 84 | 4.1 | 0.80 | 1.51 | 5,000 | 15,000 |
| Example 8 | 4 | 87 | 3.1 | 1.00 | 1.50 | 1,000 | 3,000 |
| Example 9 | 8 | 86 | 4.0 | 0.85 | 1.65 | 4,000 | 10,000 |
| Example 10 | 6 | 86 | 4.2 | 0.80 | 1.69 | 8,000 | 25,000 |
| Example 11 | 6 | 85 | 4.4 | 0.83 | 1.60 | 6,000 | 15,000 |
| Example 12 | 6 | 87 | 3.1 | 0.90 | 1.40 | 900 | 2,000 |
| Example 13 | 8 | 85 | 4.1 | 0.80 | 1.53 | 4,000 | 10,000 |
| Example 14 | 10 | 82 | 5.0 | 0.85 | 1.67 | 8,000 | 25,000 |
| Example 15 | 4 | 87 | 3.1 | 1.00 | 1.50 | 1,000 | 3,000 |
| Example 16 | 8 | 86 | 4.0 | 0.85 | 1.65 | 4,000 | 10,000 |
| Example 17 | 6 | 86 | 4.2 | 0.80 | 1.69 | 8,000 | 25,000 |
| Example 18 | 6 | 85 | 4.4 | 0.83 | 1.60 | 6,000 | 15,000 |
| Example 19 | 4 | 86 | 2.9 | 0.98 | 1.49 | 1,000 | 3,000 |
| Example 20 | 8 | 85 | 3.5 | 0.82 | 1.55 | 3,000 | 10,000 |
| Example 21 | 6 | 85 | 4.0 | 0.79 | 1.59 | 8,000 | 25,000 |
| Example 22 | 6 | 84 | 4.1 | 0.80 | 1.51 | 5,000 | 15,000 |

Copolyester of the present invention shows different crystallization property by the specific density field in proportion to the content of 2,6-naphthalene dicarboxylate moiety (NDC or NDA) and CHDM, it is possible to freely control the crystallization rate of resin itself and heat of cooling crystallization by controlling the content quantity of NDC, NDA and CHDM, and by controlling the crystallinity.

The glass clear heavy gauge sheet with copolyester is economical.

If only CHDM is used as comonomer for producing thick sheet, 30 mol % or around quantity shall be necessary. However, in the present invention, CHDM and 2,6-naphthalene dicarboxylate moiety (NDC or NDA) are used as comonomer at the same, the required content of expensive CHDM could be reduced. Consequently, it is economical.

Five, the property of produces sheet is excellent.

As the all excellent properties of PEN has been emerged to the considerable level, its durability, mechanical property, and chemical property are excellent.

What is claimed is:

1. A heavy gauge clear glass sheet composed of copolyester resins having more than 83% of visible light transmittance and lower than 5% of haze, prepared from a copolymer polymerized with an acid component consisting of (i) a terephthalate moiety and a 2,6-naphthalene dicarboxylate moiety or (ii) a terephthalate moiety, a 2,6-naphthalene dicarboxylate moiety and an isophthalate moiety with glycol component comprising (i) ethyleneglycol (EG) itself, or (ii) the mixture of ethyleneglycol (EG) and 1,4-cyclohexandimethanol (CHDM), the aforesaid copolymer being (i) stable firmly so as not to decompose when melted; and (ii) having a high melt viscosity, such that when cooling there is no crystallization to deteriorate transparency, and the resins are of low crystallinity.

2. A heavy gauge clear glass sheet of copolyester resins prepared according to claim 1, wherein the heat of cooling crystallization (ΔHme) is less than 1.0 J/g.

3. A heavy gauge clear glass sheet of copolyester resins prepared according to claim 1, wherein the melt viscosity measured in shear rate of 100 sec.-1 at the temperature of 270° C. is from 1700 to 30,000 poise.

4. A heavy gauge clear glass sheet of copolyester prepared according to claim 1, wherein the melt viscosity measured in shear rate of 1000 sec.-1 at the temperature of 270° C. is 900 to 8,000 poise.

5. A heavy gauge clear glass sheet of copolyester prepared according to claim 1, wherein the thickness is over 1 mm.

6. A heavy gauge clear glass sheet of copolyester prepared according to claim 1, wherein the refractive index of visible light is from 1.35 to 1.70.

7. A heavy gauge clear glass sheet of copolyester prepared according to claim 1, wherein the terephthalate moiety comprises dimethylterephthalate (DMT) or terephthalic acid (TPA).

8. A heavy gauge clear glass sheet of copolyester prepared according to claim 1, wherein the dicarboxylate moiety is either dimethyl-2,6-naphthalenedicarboxylate (NDC) or 2,6-naphthalenedicarboxyl acid (NDA).

9. A heavy gauge clear glass sheet of copolyester prepared according to claim 1, wherein the isophthalate moiety is isophthalic acid (IPA) or dimethylisophthalate (DMI).

10. A heavy gauge clear glass sheet of copolyester prepared according to claim 1, wherein the content of 2,6-napthalenedicarboxylate moiety is less than 20 mol % based upon the total acid component.

* * * * *